United States Patent
Meyers

(10) Patent No.: US 9,231,694 B1
(45) Date of Patent: Jan. 5, 2016

(54) METHOD FOR ESTABLISHING PLATFORM FOR TRANSLATING BETWEEN DEVICE INPUTS

(75) Inventor: Richard C. Meyers, Longboat Key, FL (US)

(73) Assignee: GlobalTrak, LLC, Sterling, VA (US)

( * ) Notice: Subject to any disclaimer, the term of this patent is extended or adjusted under 35 U.S.C. 154(b) by 608 days.

(21) Appl. No.: 13/426,563

(22) Filed: Mar. 21, 2012

Related U.S. Application Data

(60) Provisional application No. 61/454,606, filed on Mar. 21, 2011.

(51) Int. Cl.
*H04B 3/36* (2006.01)
*H04B 7/26* (2006.01)

(52) U.S. Cl.
CPC .................................. *H04B 7/2606* (2013.01)

(58) Field of Classification Search
None
See application file for complete search history.

(56) References Cited

U.S. PATENT DOCUMENTS

| 8,583,123 B2 * | 11/2013 | Chang et al. ................. 455/442 |
| 2007/0161374 A1 * | 7/2007 | Kienstra et al. .............. 455/436 |
| 2012/0315841 A1 * | 12/2012 | Zhou et al. .................. 455/11.1 |

* cited by examiner

*Primary Examiner* — Edward Urban
*Assistant Examiner* — Mohammed Rachedine

(57) ABSTRACT

The present invention provides a platform for translating between devices, updating device software, receiving and normalizing device signals, processing them, and determining appropriate responses to containers. The present invention seeks to keep intelligence at the back end allowing smart devices to remain effective under the complex conditions of the intermodal shipping industry. According to a further preferred embodiment, the invention further includes container transponders adapted to receive local signals and repeat or forward the signals. Further, the present invention discloses a method designed to increase signal reliability between smart devices which may act as relay nodes to communicate with existing devices.

3 Claims, 4 Drawing Sheets

METHOD FOR ESTABLISHING PLATFORM FOR TRANSLATING BETWEEN DEVICE INPUTS

BACKGROUND AND FIELD OF THE PRESENT INVENTION

1. Field of the Present Invention

The present invention relates generally to a system for remote monitoring of smart cargo container security devices and more specifically to providing a platform for translating between device inputs that includes container transponders adapted to receive local signals and repeating or forwarding signals to an Information Management Bureau (IMB) capable of providing a universal device architecture for normalizing system functions from container to container.

2. Background of the Invention

In today's security conscious shipping environment, smart container monitoring systems and alarming devices have become part of the long term solution. Current computer tracking systems are effective at monitoring the location of individual containers from point of origin to destination and maintaining an inventory of loaded and empty containers. Most of these systems rely on transponders mounted on the containers that send messages to satellites or ground stations, from which the messages are rerouted to shipping companies, freight forwarders and companies.

A smart container monitoring system may include a sensing system for monitoring the contents of the container as well as the exterior environment of the container, an on-board processing system comprising a signal receiving element for receiving sensor data from the sensing system, a communication system, a memory for storing predetermined conditions, and a control element for analyzing received sensor data and declaring security alerts. Wide-spread fielding of the smart container monitoring systems will require standardization and the system wide infrastructure to ensure container systems are able to communicate effectively with the remote monitoring station, data fusion centers and/or satellites.

Today, approximately 90% of non-bulk cargo worldwide is transported by container, and modern container ships can carry up to 15,000 Twenty-foot equivalent units (TEU). As a class, container ships now rival crude oil tankers and bulk carriers as the largest commercial vessels on the ocean. On the decks of modern barges and transport ships, a single smart cargo container stacked among the freight of the massive bulk carriers may experience a Faraday Cage effect whereby the reception of external radio signals and electromagnetic transmissions can be greatly attenuated or blocked altogether.

A Faraday Cage's operation depends on the fact that an external static electrical field will cause the electrical charges within the cage's conducting material to be redistributed so as to cancel the field's effects in the cage's interior. This phenomenon is used, for example, to protect electronic equipment from lightning-strikes and other electrostatic discharges. While Faraday Cages cannot block static and slowly varying magnetic fields, such as Earth's magnetic field (a compass will still work inside), to a large degree, they can shield the interior from external electromagnetic radiation if the conductor is thick enough and any holes are significantly smaller than the radiation's wavelength.

SUMMARY OF THE PRESENT INVENTION

To address the shortcomings presented in the prior art, the present invention provides a universal device architecture at the IMB level to provide a platform for translating between devices, updating device software, receiving and normalizing device signals, processing them, and determining appropriate responses to containers. The present invention seeks to keep intelligence at the back end allowing smart devices to remain effective under the complex conditions of the intermodal shipping industry. According to a further preferred embodiment, the invention further includes container transponders adapted to receive local signals and repeat or forward the signals to the IMB. Further, the present invention discloses a method designed to increase signal reliability between smart devices which may act as relay nodes to communicate with existing devices.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
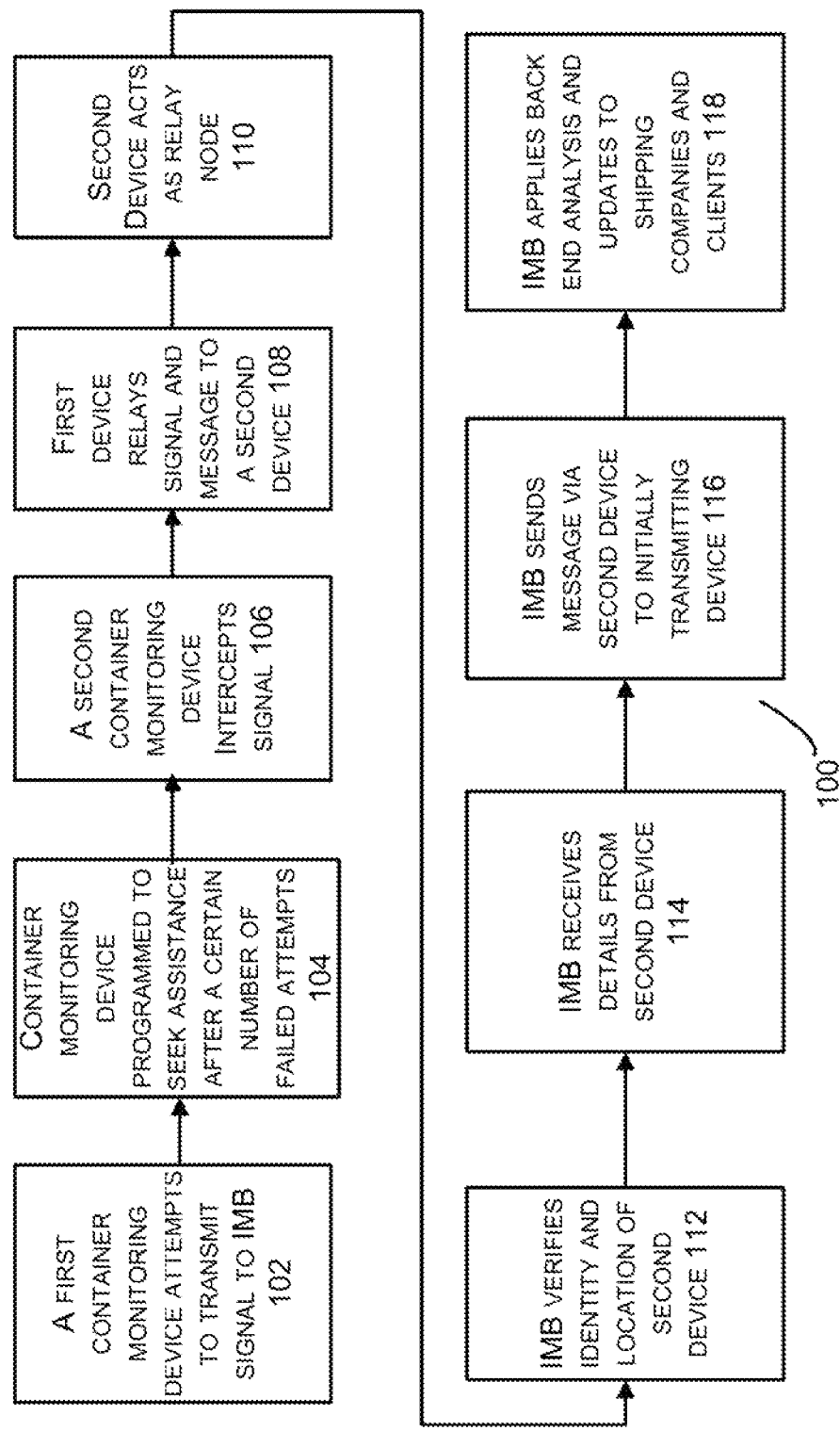
FIG. 1 describes a method for establishing platform for translating between devices in accordance with one aspect of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a method according to an embodiment of the present invention will now be discussed. As shown in FIG. 1, a first container monitoring device attempts to transmit a signal to the IMB 102. After a certain predetermined number of failed attempts to transmit the signal, the device will automatically seek another container monitoring device to act as courier for sending the message 104 to the IMB. Upon detecting communication with a second smart container monitoring device 106 the first container monitoring device will relay its message to the second container monitoring device which has been determined as capable of intercepting its signal 108. The second container monitoring device becomes a relay node for transmitting this message 110.

Preferably, according to one aspect of the present invention, there may be more than one monitoring device participating as multiple relay nodes in a series act to successfully ensure that a single message is transmitted to the IMB. Further, preferably, the same devices will participating in receiving and relaying a message from the IMB back to the target device in a reverse series of relays.

As further shown in FIG. 1, thereafter, the IMB may verify the identity and location of the last transmitting device in the series 112 and receive the details of the message from the last transmitting device. After processing the information received, the IMB may attempt to make directly make contact with the first container monitoring device from which the message was initiated, but will also transmit its response via the series of devices from which the message was successfully received 116. Further, after the IMB receives details from the first monitoring device, the IMB may apply backend analysis and provide information and updates as ongoing support to the shipping companies and other clients 118.

Figure 2:
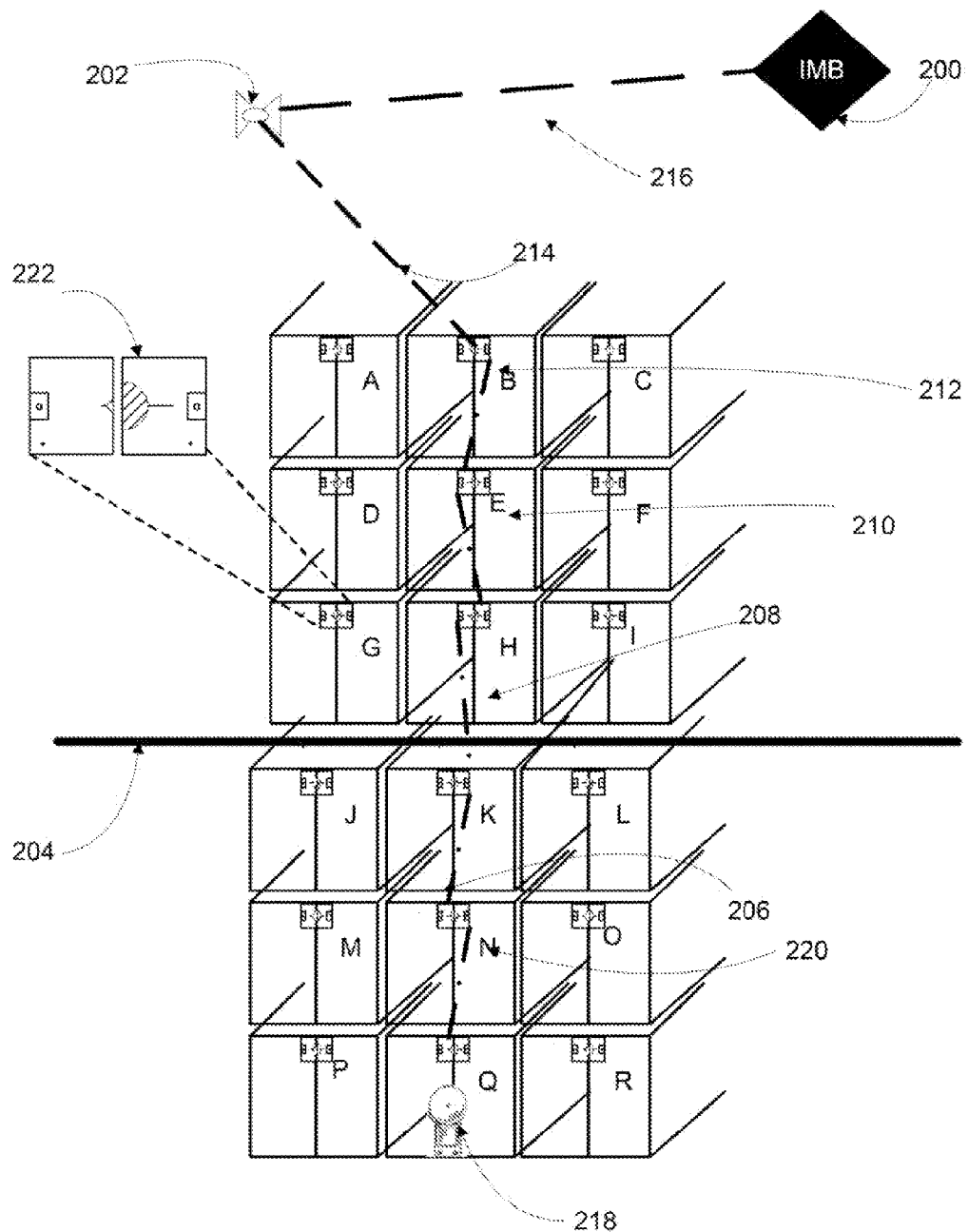
FIG. 2 shows a functional configuration in accordance with an embodiment of the present invention.

With reference now to FIG. 2, a functional configuration in accordance with an embodiment of the present invention will now be discussed. As shown in FIG. 2, a cross sectional view of the deck of a ship 204 on which nine smart cargo containers, A-I, are stacked above the ship deck 204 and nine smart cargo containers, J-R, below the ship's deck 204, a satellite 202 and an IMB 100. As shown in FIG. 2, each container, A-R, has a smart container monitoring device which includes a transponder capable of serving as a signal relay node 222.

As shown in FIG. 2, Container Q is signaling an alarm event 218 which is intended to reach the IMB 200. However, based on the positioning of Container Q, the signal is blocked horizontally by the adjacent containers and vertically by the deck 204 and the three containers H, E and B, which are on top of the container and additionally attenuating the signal transmitted from Container Q 220.

As further shown in FIG. 2, the initial signal transmitted by Container Q 220 may be received by the transponder in the monitoring device of Container N and the repeater module of the monitoring device of Container N may receive the signal, strengthen it and relay the signal 206 to the transponder of the Container K. Preferably, the signal from Container K may be received by the transponder of the Container B which may transmit the signal 214 to a receiving satellite 202 which may transmit the signal 216 to the IMB 200. Also preferably, the signal from Container K 208 may be received by the transponder of Container H, picked up by the signal repeater and transmitted 210 to transponder of Container E, the signal will be picked up by the signal repeater of Container E and transmitted 212 to repeater unit of Container B, which may transmit the signal 214 to a receiving satellite 202 which may transmit the signal 216 to the IMB 200.

Figure 3:
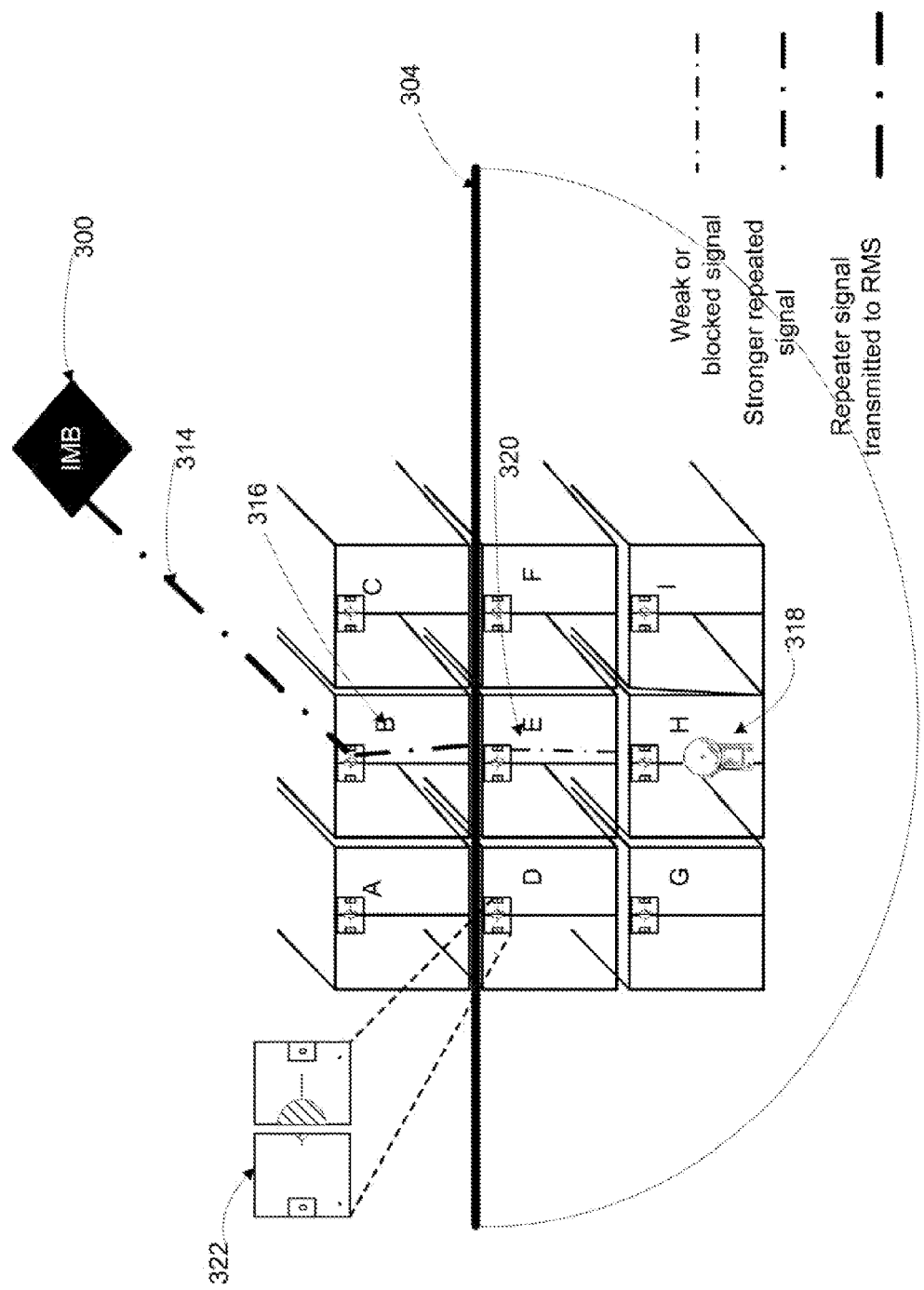
FIG. 3 shows a functional configuration in accordance with an embodiment of the present invention.

With reference now to FIG. 3, a functional configuration in accordance with an embodiment of the present invention will now be discussed. As shown in FIG. 3, a cross sectional view of the deck of a ship 304 on which three smart cargo containers, A-C, are stacked above the ship deck 304 and six smart cargo containers, D-I, below the ship's deck 304, and an IMB 300. As shown in FIG. 3, each container, A-I, has a smart container monitoring device 322 which includes a transponder capable of serving as a signal relay node.

As shown in FIG. 3, Container H is signaling an alarm event 318 which is intended to reach the IMB 300. However, based on the positioning of Container H, the signal is blocked horizontally by adjacent containers and vertically by the deck 304 and containers E and B, which are on top of the container and additionally attenuating the signal transmitted from Container H 320.

As further shown in FIG. 3, the initial signal transmitted by Container H 320 may be received by the transponder in the monitoring device of Container E and the repeater module of the monitoring device of Container E may receive the signal, strengthen it and relay the signal 316 to the transponder of the Container B. Preferably, the signal from Container H 320 may be received by the transponder of the Container B which may transmit the signal 314 to the IMB 300. Also preferably, the signal from Container H 320 may be received by the transponder of Container E, picked up by the signal repeater and transmitted 316 to the transponder of Container B, the signal 316 will be picked up by the signal repeater of Container B and transmitted 314 to the IMB 300.

Figure 4:
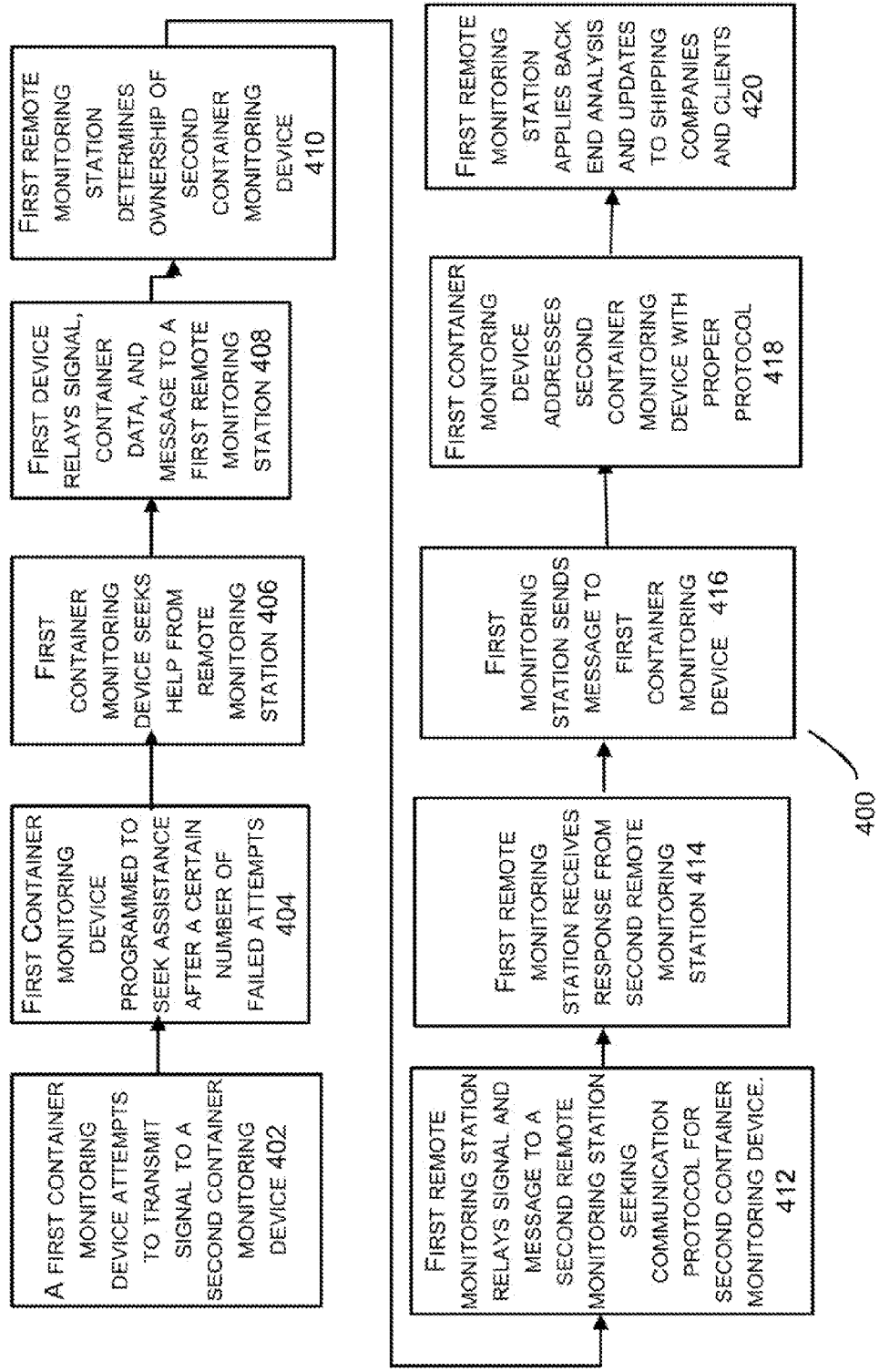
FIG. 4 describes a method for establishing platform for translating between devices in accordance with one aspect of the present invention.

With reference now to FIG. 4, a method according to an embodiment of the present invention will now be discussed. As shown in FIG. 4, a first container monitoring device attempts to transmit a signal to a second container monitoring device 402. After a certain predetermined number of failed attempts to transmit the signal 404, the device is programmed to automatically seek assistance from a first remote monitoring station 406. The first container monitoring device relays a signal, the data it has on the second container monitoring device, and its message to the first remote monitoring station 408. The first remote monitoring station applies back end analysis and attempts to determine the identity, ownership and management of the second container monitoring device 410. The first remote monitoring station may relay its data, signal, and message to a second remote monitoring station to seek assistance with the communication protocol for the second container monitoring device 412. The first remote monitoring station receives a response, from the second remote monitoring station 414 and sends the message to the first container monitoring device 416. The first container monitoring device addresses the second container monitoring device with the proper signaling protocol 418. The two container monitoring devices are now free to communication directly. The first remote monitoring station may apply back end analysis and updates to shipping companies and clients 420.

In accordance with a preferred embodiment of the present invention the communication system may include a wireless connection in a satellite mode to communicate with a satellite system such as Globalstar or Orbcomm. Preferably, such a satellite device will be a device such as the Axxon, AutoTracker, or the like, or a customized Orbcomm VHF satellite GPS tracking communications device which may be adapted with Zigbee interface antenna devices to incorporate them into the overall LAN architecture of the security system; these devices include a satellite transceiver, GPS receiver, a customized Zigbee wireless antenna with a serial (Ax Tracker) or duplex (OrbComm) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data Interchange, XML, E-mail, HTML and flat text files. After receiving such data, the data fusion center preferably would act to process information to identify anomalies. With this data collected and processed, analyst may calculate statistics and probability of detection models used for decision support.

It is preferred that the controller unit of a smart container monitoring unit incorporates a microprocessor, a real time clock, a general purpose Input/Output port to support external peripheral control, a Universal Synchronous/Asynchronous Receiver Transmitter (USART), a Serial Port Interface (SPI), and memory such as RAM, a FLASH memory, and EEPROM. The controller will preferably manage power and host the master date-time clock, communication scheduling and annotation of flash memory records.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. In a system for allowing communications between at least a first shipping container and a second shipping container, a method comprises:
    transmitting a first message from the first shipping container to a first remote monitoring station;
    determining that communication is needed between the first shipping container and the second shipping container;
    sending a second message seeking communication with the second shipping container;
    determining that the second message failed;
    transmitting a third message to the first remote monitoring station which includes location and container identifying data and which requests assistance to communicate with the second container;
    identifying a second remote monitoring station responsible for managing the second container;
    sending a fourth message from the first remote monitoring station to the second remote monitoring station, wherein the fourth message includes location and container identifying data and which requests assistance to communicate with the second container;
    receiving a responsive message from the second remote monitoring station back to the first remote monitoring station providing communication data to allow communication with the second container monitoring device;
    transmitting communication data from the first remote monitoring station to the first container monitoring device;
    transmitting a fifth message from the first shipping container to the second shipping container utilizing the communication data transmitted from the first remote monitoring station;
    relaying the fifth message from the second shipping container to the first remote monitoring station;
    receiving a responsive message from the first remote monitoring station at the second container; and
    transmitting the responsive message from the second shipping container to the first shipping container.

2. The method of claim 1, wherein the second shipping container seeks at least one additional transmitting device to act as a relay node for transmitting the fifth message to the first remote monitoring station.

3. The method of claim 1, wherein the method further comprises the step of:
    retrieving and analyzing data regarding the second message to determine the cause of the failed transmission.

\* \* \* \* \*